United States Patent
Wang et al.

(10) Patent No.: US 11,294,143 B2
(45) Date of Patent: Apr. 5, 2022

(54) OPTICAL ELEMENT DRIVING MECHANISM

(71) Applicant: TDK TAIWAN CORP., Taoyuan (TW)

(72) Inventors: Chao-Hsi Wang, Taoyuan (TW); Chao-Chang Hu, Taoyuan (TW); Kuen-Wang Tsai, Taoyuan (TW); Chih-Wei Weng, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 29 days.

(21) Appl. No.: 16/843,326

(22) Filed: Apr. 8, 2020

(65) Prior Publication Data

US 2020/0363699 A1 Nov. 19, 2020

Related U.S. Application Data

(60) Provisional application No. 62/849,317, filed on May 17, 2019.

(30) Foreign Application Priority Data

Feb. 3, 2020 (CN) .......................... 202020150656.2

(51) Int. Cl.
| | |
|---|---|
| *H04N 5/225* | (2006.01) |
| *G03B 9/40* | (2021.01) |
| *G02B 7/09* | (2021.01) |
| *G02B 27/64* | (2006.01) |
| *G03B 13/36* | (2021.01) |
| *H02K 41/035* | (2006.01) |
| *G03B 5/00* | (2021.01) |
| *H02K 11/21* | (2016.01) |
| *H02K 37/04* | (2006.01) |

(52) U.S. Cl.
CPC ............. *G02B 7/09* (2013.01); *G02B 27/646* (2013.01); *G03B 5/00* (2013.01); *G03B 9/40* (2013.01); *G03B 13/36* (2013.01); *H02K 11/21* (2016.01); *H02K 37/04* (2013.01); *H02K 41/0354* (2013.01); *H04N 5/2254* (2013.01); *G03B 2205/0007* (2013.01); *G03B 2205/0069* (2013.01)

(58) Field of Classification Search
CPC .................................... G03B 9/14; G03B 9/40
See application file for complete search history.

(56) References Cited

U.S. PATENT DOCUMENTS

| | | | | |
|---|---|---|---|---|
| 2002/0125843 A1* | 9/2002 | Mizumaki | ................ | G03B 7/10 318/400.41 |
| 2012/0315953 A1* | 12/2012 | Du | ....................... | H04N 5/2251 455/556.1 |

* cited by examiner

*Primary Examiner* — Noam Reisner
(74) *Attorney, Agent, or Firm* — Muncy, Geissler, Olds & Lowe, P.C.

(57) ABSTRACT

An optical element driving mechanism is provided. The optical element driving mechanism includes a fixed portion, a movable portion, and a driving assembly. The movable portion is movably disposed on the fixed portion. The driving assembly is disposed on the fixed portion and drives the movable portion to move relative to the fixed portion.

16 Claims, 14 Drawing Sheets

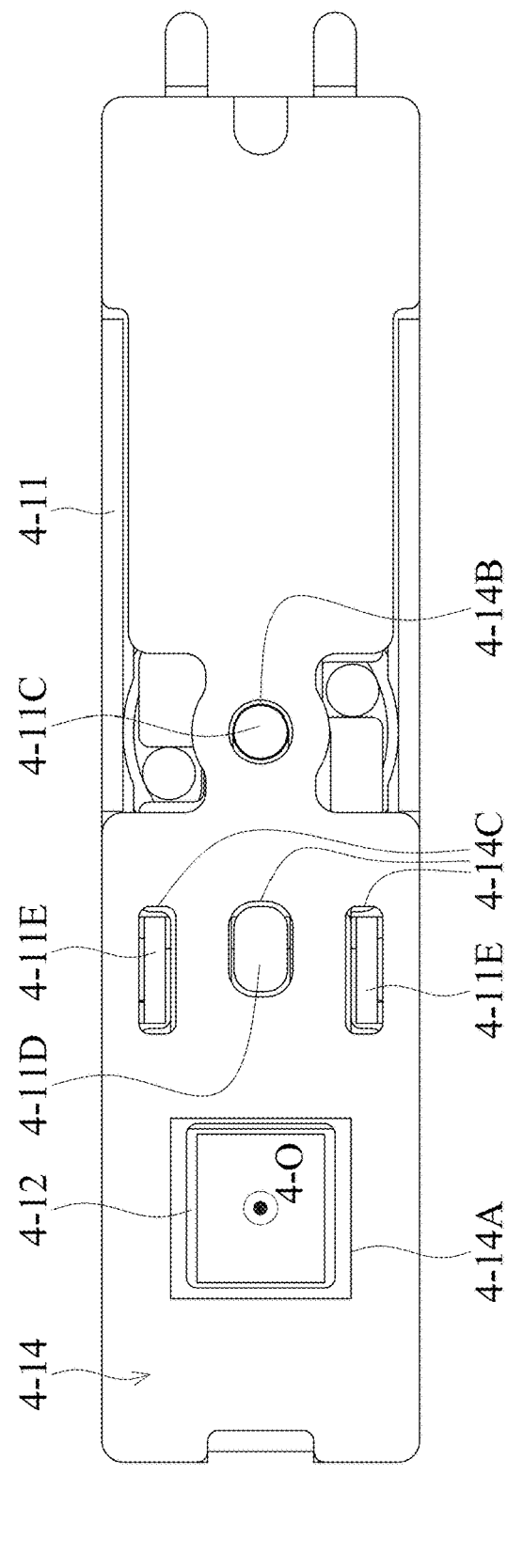
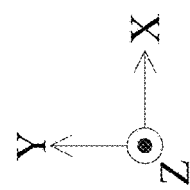

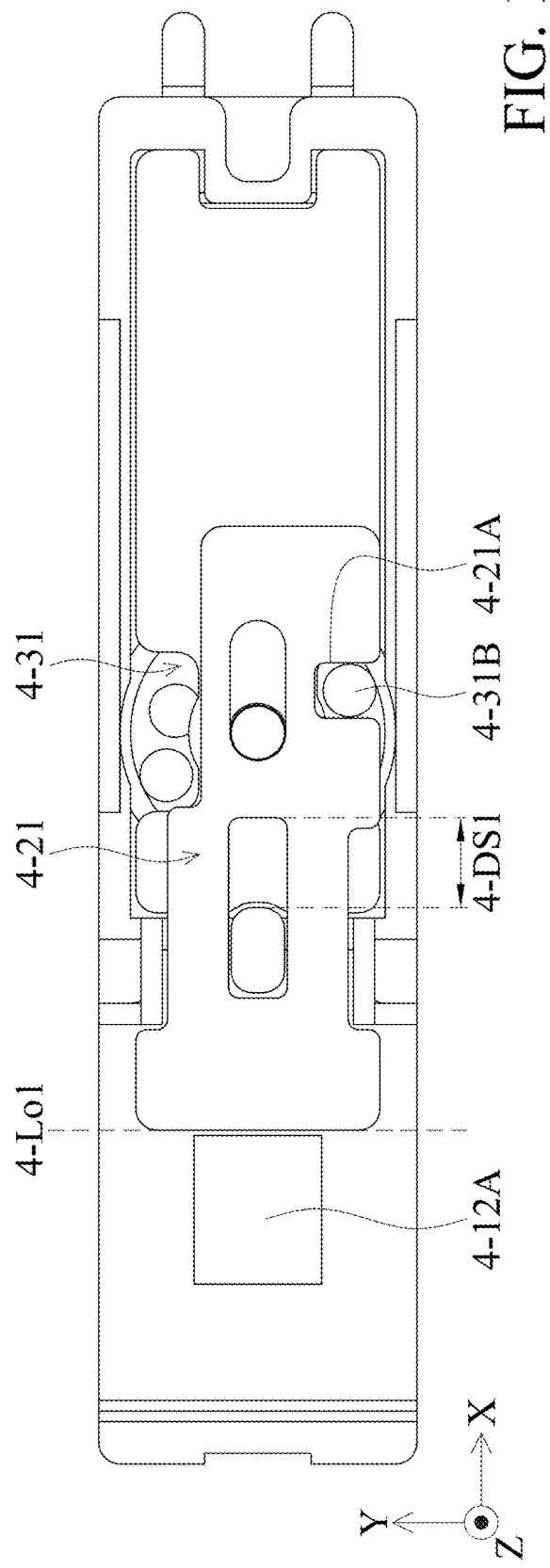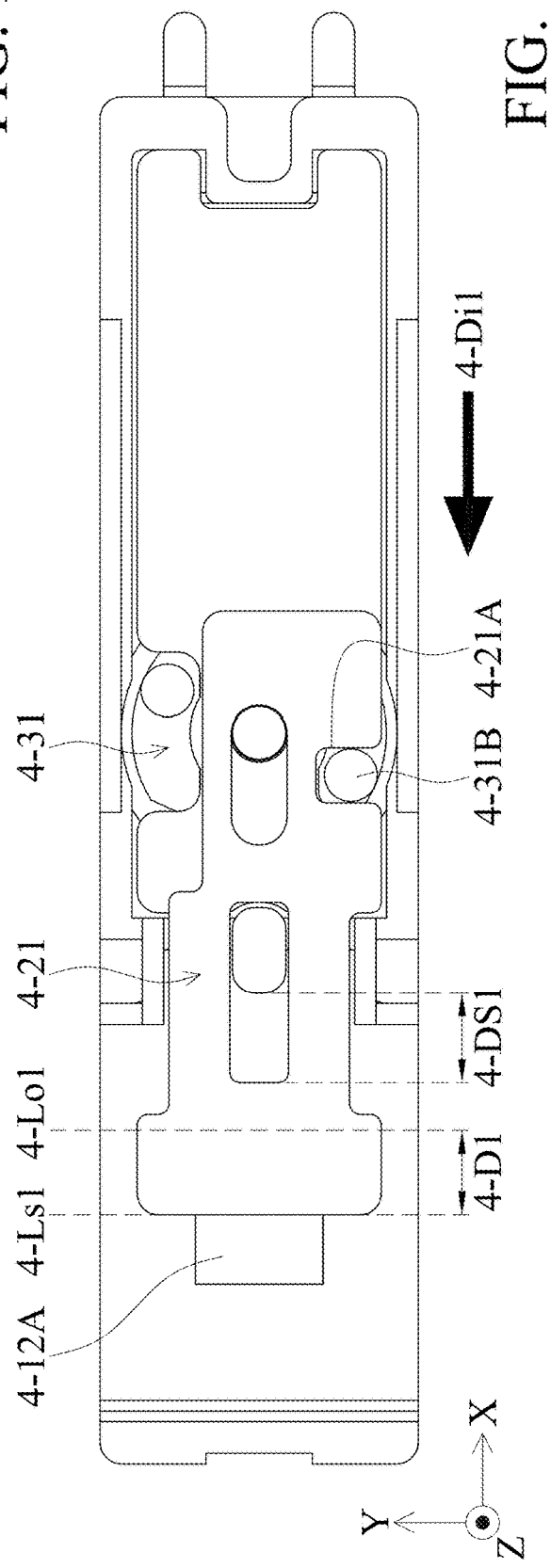
FIG. 10A
FIG. 10B

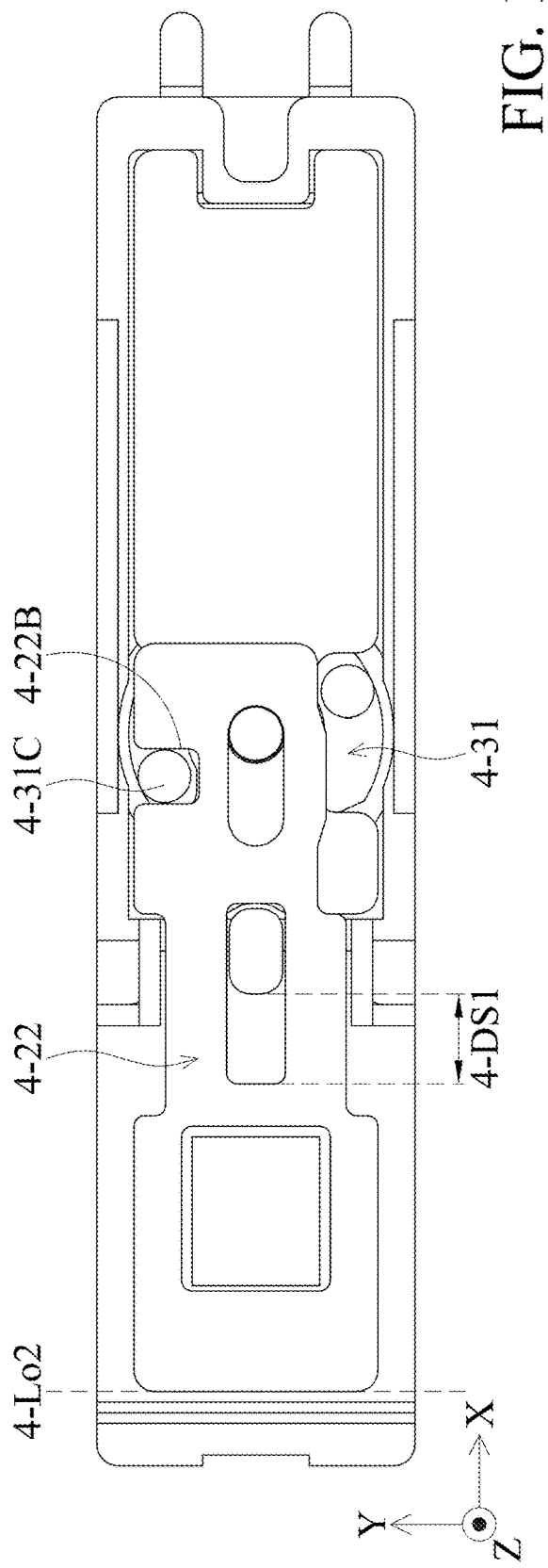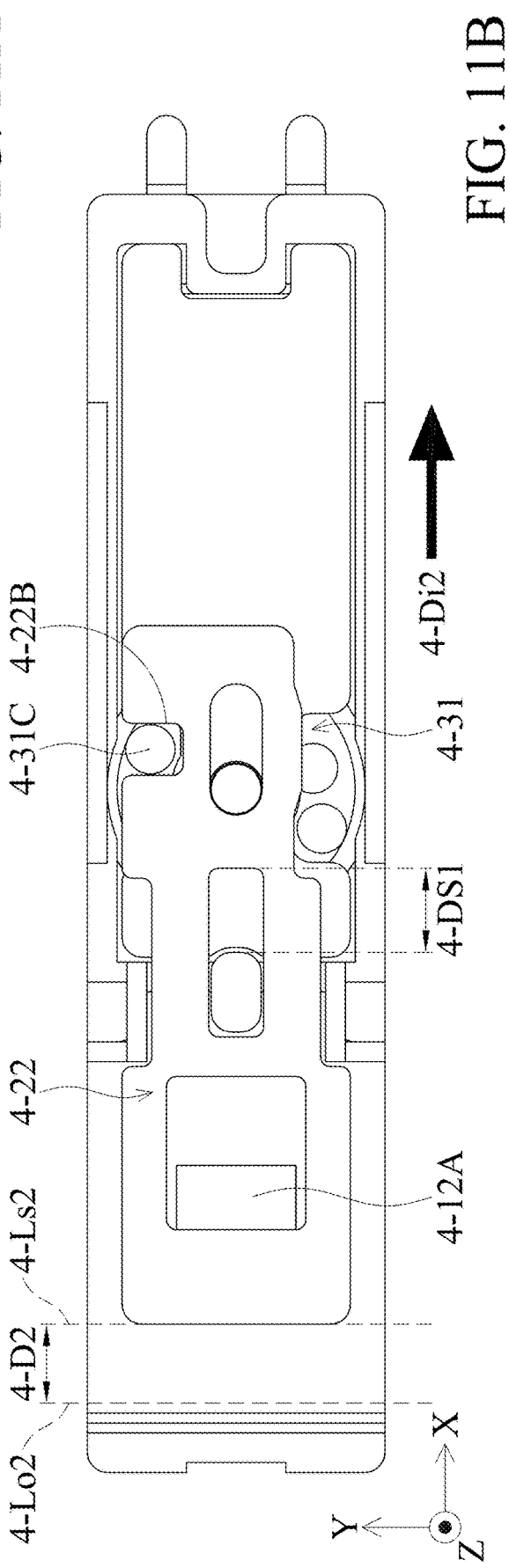
FIG. 11A
FIG. 11B

OPTICAL ELEMENT DRIVING MECHANISM

CROSS-REFERENCE TO RELATED APPLICATIONS

The present application claims priority to U.S. Provisional Patent Application No. 62/849,317, filed May 17, 2019, and China Patent Applications No. 202020150656.2, filed on Feb. 3, 2020, which are incorporated by reference herein in their entirety.

BACKGROUND OF THE DISCLOSURE

Field of the Disclosure

The present invention relates to a driving mechanism, and more particularly to an optical element driving mechanism.

Description of the Related Art

With the development of technology, many electronic devices (such as computers) now have the function of taking pictures or videos. However, when an optical element (such as a shutter) for controlling the amount of light needs to be provided in an electronic device, it will cause an increase in the thickness of the electronic device, which is not conducive to reducing the thickness of the electronic device. In view of this, how to design an optical element driving mechanism that can make the electronic device thinner and can control the amount of light has become an important issue.

BRIEF SUMMARY OF THE DISCLOSURE

An embodiment of the invention provides an optical element driving mechanism having an optical axis, including a fixed portion, a movable portion and a driving assembly. The movable portion is movably disposed on the fixed portion. The driving assembly is disposed on the fixed portion and drives the movable portion to move relative to the fixed portion.

According to some embodiments of the present disclosure, the driving assembly includes a magnetic element, and the magnetic element has a first protruding portion and a second protruding portion. The movable portion includes a first shutter and a second shutter, the first shutter is engaged with the first protrusion, and the second shutter is engaged with the second protrusion. The driving assembly further includes a driving coil, and the fixed portion includes a base and a frame. The base includes a magnetic element receiving portion, a driving coil receiving portion, and a main stopper. The magnetic element receiving portion receives the magnetic element. The driving coil receiving portion receives the driving coil, and is disposed close to the magnetic element receiving portion, and when viewed in a direction that is perpendicular to the optical axis, the magnetic element receiving portion overlaps the driving coil receiving portion. The main stopper restricts the first shutter and the second shutter to moving within a first stopping distance. The frame has an opening, and extends from the base toward a first direction, and the first direction is perpendicular to the optical axis. A material of the frame is metal, and the frame is fixed to the base by insert molding. A winding axis of the driving coil is parallel with the first direction. The driving assembly further includes a magnetically permeable element disposed in the driving coil, and one end of the magnetically permeable element is exposed from the driving coil. The first shutter has a first shutter recess hole and the second shutter has a second shutter recess hole, the main stopper pass through the first shutter recess hole and the second shutter recess hole.

According to some embodiments of the present disclosure, the driving coil drives the magnetic element to rotate at an angle to drive the first shutter to move a first distance in the first direction from a first shutter initial position to a first shutter shielding position, and drive the second shutter to move a second distance in a second direction from a second shutter initial position to a second shutter shielding position. The first direction and the second direction are opposite directions. The first distance is equal to the second distance. The first shutter moves the first distance to shield at least half of the area of the opening, and the second shutter moves the second distance to shield at least half of the area of the opening. The first shutter is located in the first shutter shielding position and the second shutter is located in the second shutter shielding position, and when viewed in a direction that is parallel with the optical axis, the first shutter partially overlaps the second shutter. The first distance is shorter than or equal to the first stopping distance.

According to some embodiments of the present disclosure, the opening of the frame is rectangular, and a long side of the opening is parallel with the first direction. The first stopping distance is greater than half the length of the long side of the opening.

According to some embodiments of the present disclosure, the base further includes an auxiliary stopper to restrict the first shutter and the second shutter to moving within a second stopping distance. The first stopping distance is shorter than the second stopping distance.

According to some embodiments of the present disclosure, the optical element driving mechanism further includes an optical module, and the optical axis passes through the center of the optical module, and the optical module has a rectangular structure.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 5 is a schematic diagram of a partial structure of an optical element driving mechanism according to an embodiment of the present invention.

FIG. 10A is a schematic diagram of a partial structure of an optical element driving mechanism according to an embodiment of the present invention.

FIG. 10B is a schematic diagram of a partial structure of an optical element driving mechanism according to an embodiment of the present invention.

FIG. 11A is a schematic diagram of a partial structure of an optical element driving mechanism according to an embodiment of the present invention.

FIG. 11B is a schematic diagram of a partial structure of an optical element driving mechanism according to an embodiment of the present invention.

DETAILED DESCRIPTION OF THE DISCLOSURE

Figure 1:
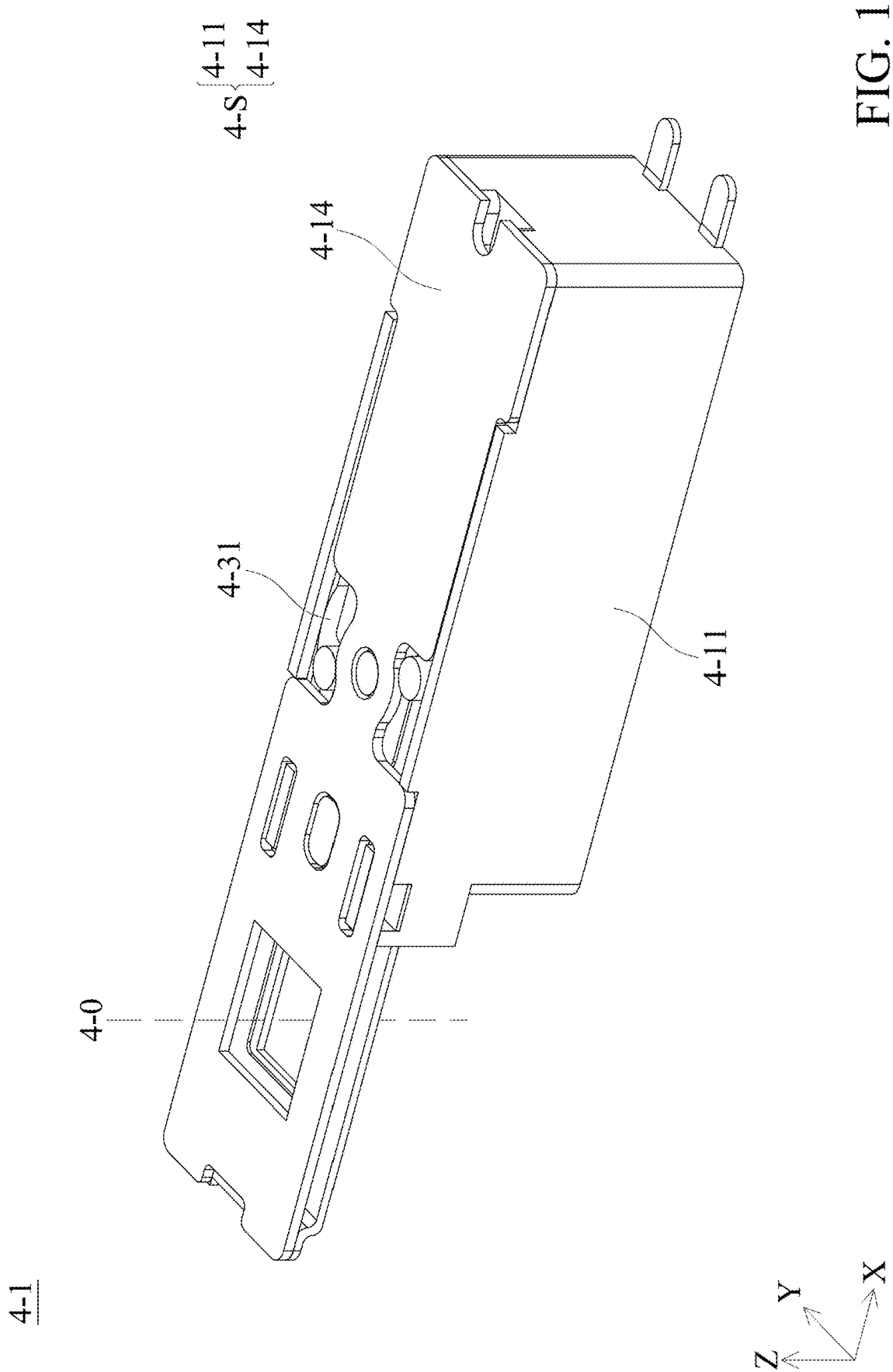
FIG. 1 is a perspective view showing an optical element driving mechanism according to an embodiment of the present invention.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
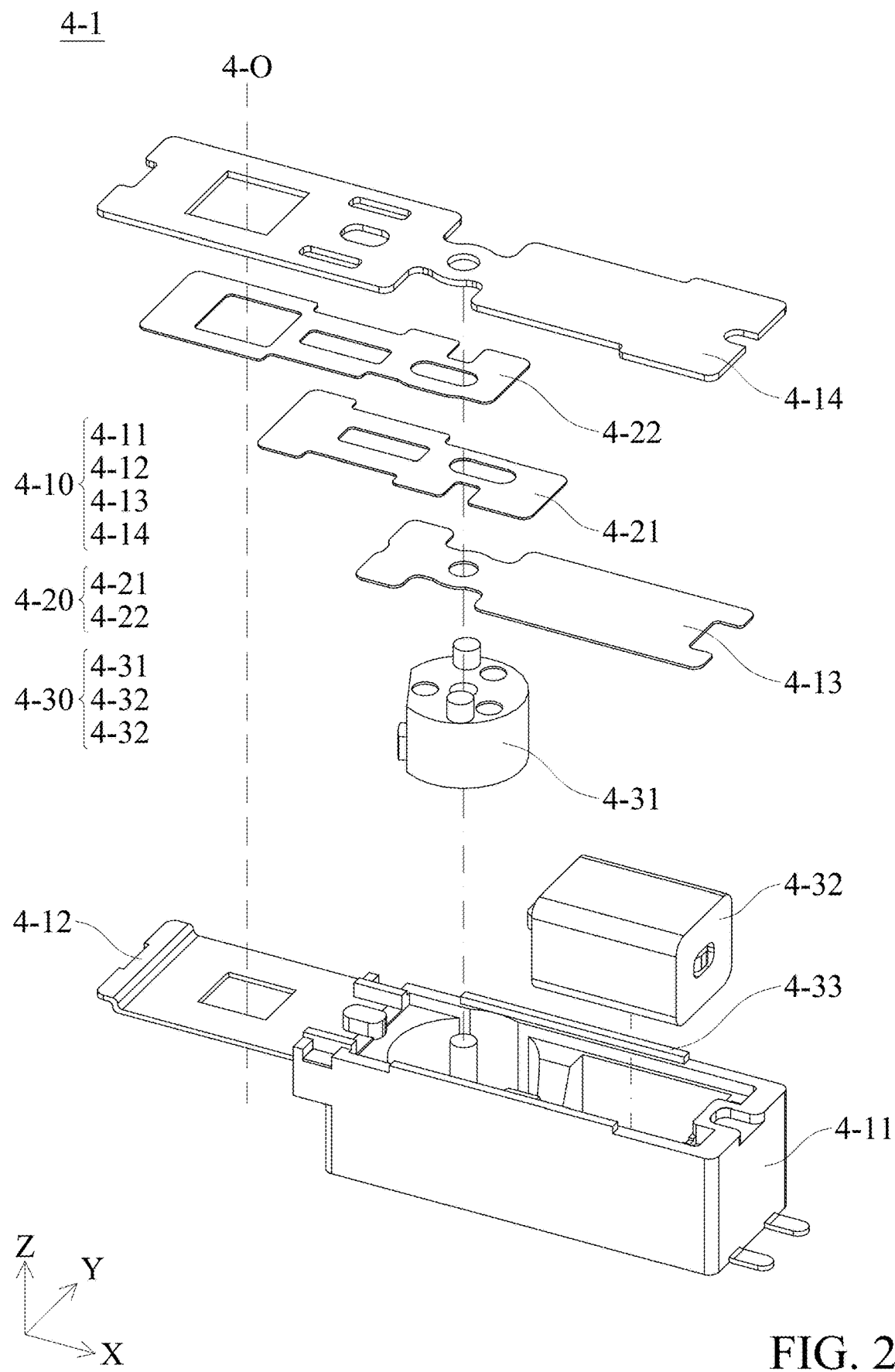
FIG. 2 is an exploded view of an optical element driving mechanism according to an embodiment of the present invention.

Refer to FIG. 1 to FIG. 2. FIG. 1 is a perspective view of an optical element driving mechanism 4-1 according to an embodiment of the present invention, and FIG. 2 is an exploded view of an optical element driving mechanism 4-1 according to an embodiment of the present invention. The optical element driving mechanism 4-1 has an optical axis 4-O, and includes a fixed portion 4-10, a movable portion 4-20, and a driving assembly 4-30. The fixed portion 4-10 includes a base 4-11, a frame 4-12, a fixing plate 4-13, and a cover 4-14. The movable portion 4-20 includes a first shutter 4-21 and a second shutter 4-22. The driving assembly 4-30 includes a magnetic element 4-31, a driving coil 4-32, and a magnetically permeable element 4-33. The movable portion 4-20 is movably disposed on the fixed portion 4-10. The driving assembly 4-30 is disposed on the fixed portion 4-10.

Figure 3:
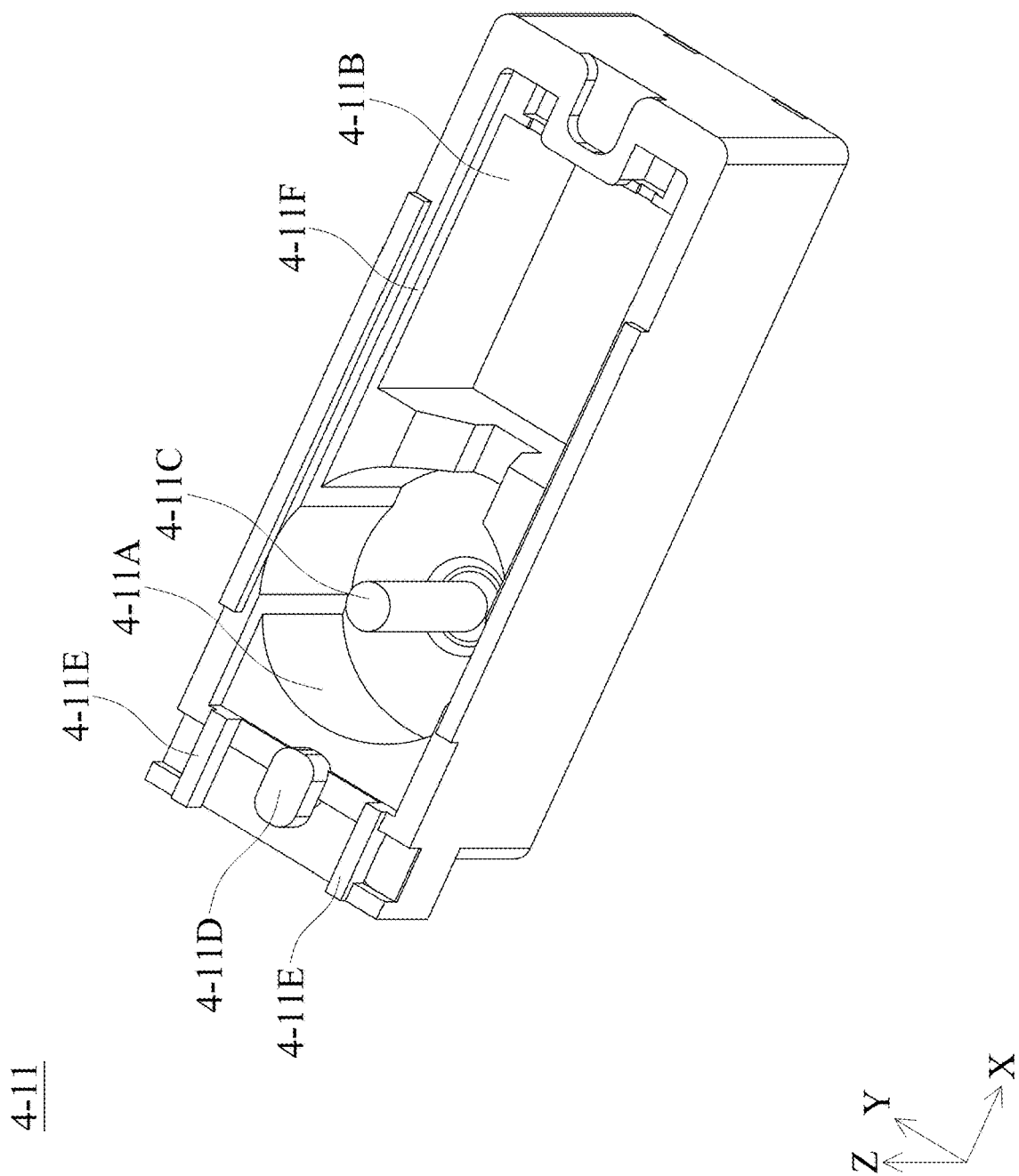
FIG. 3 is a perspective view of a base of an optical element driving mechanism according to an embodiment of the present invention.

Refer to FIG. 3, which is a perspective view of the base 4-11 of the optical element driving mechanism 4-1 according to an embodiment of the present invention. The base 4-11 has a magnetic element receiving portion 4-11A, a driving coil receiving portion 4-11B, a support shaft 4-11C, a main stopper 4-11D, an auxiliary stopper 4-11E, and a slide rail 4-11F. The magnetic element receiving portion 4-11A receives the magnetic element 4-31, and the driving coil receiving portion 4-11B receives the driving coil 4-32. The support shaft 4-11C is disposed in the magnetic element receiving portion 4-11A. The main stopper 4-11D and the auxiliary stopper 4-11E are extension structures of the side walls of the base 4-11. The slide rail 4-11F is disposed on the two side walls of the base 4-11, and receives a part of the first shutter 4-21 and the second shutter 4-22. In this embodiment, the base 4-11 is made of resin to avoid affecting the driving assembly 4-30 disposed therein.

Figure 4:
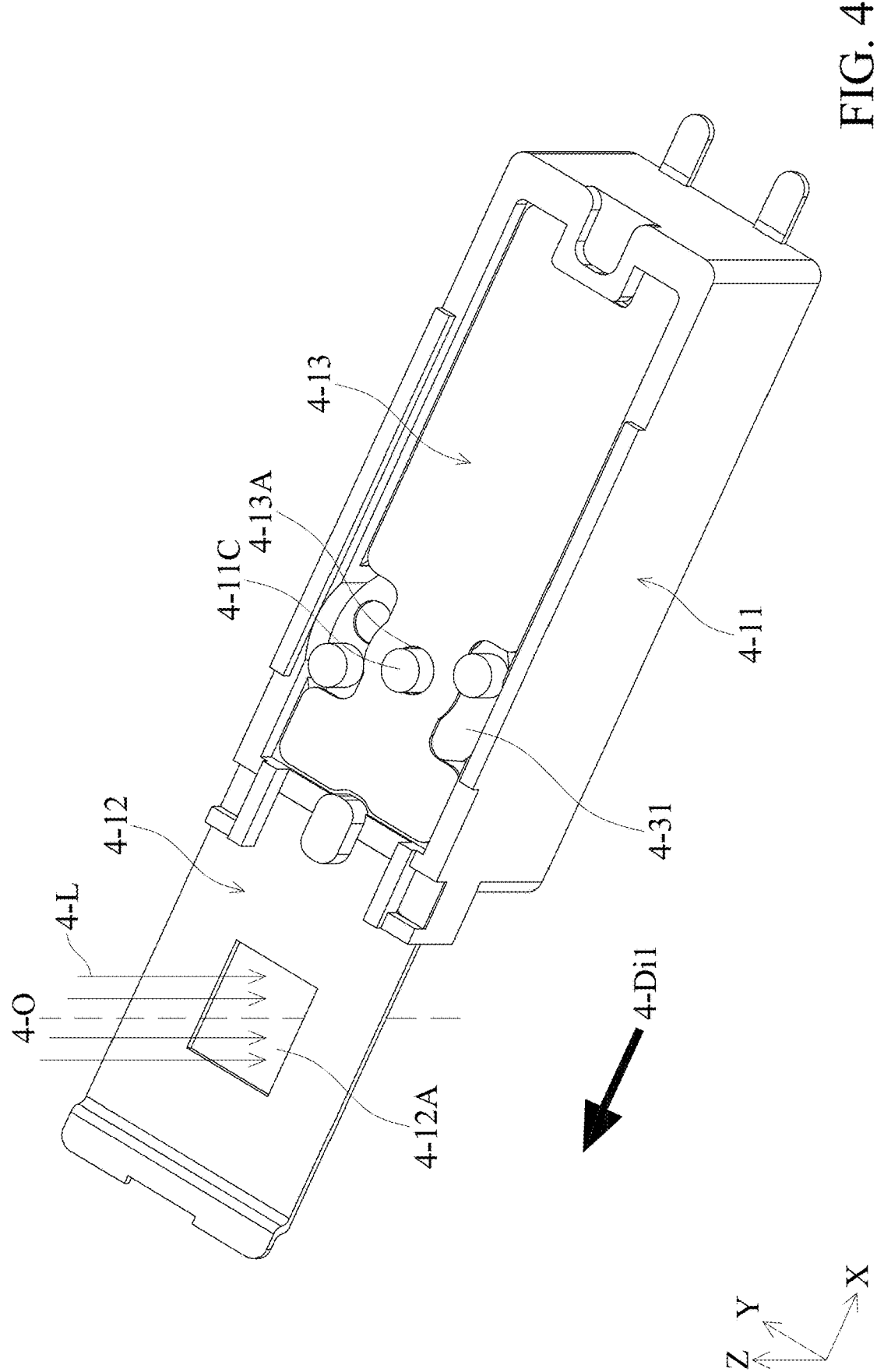
FIG. 4 is a schematic diagram of a partial structure of an optical element driving mechanism according to an embodiment of the present invention.

Refer to FIG. 4, which is a schematic diagram of a partial structure of the optical element driving mechanism 4-1 according to an embodiment of the present invention. The frame 4-12 is made of metal to support the movable portion 4-20 and the cover 4-14. A part of the frame 4-12 is embedded and fixed in the base 4-11 by insert molding. The remaining part extends toward a first direction 4-Di1 and away from the base 4-11, and the first direction 4-Di1 is perpendicular to the optical axis 4-O. The frame 4-12 has an opening 4-12A, so that an incident light 4-L can pass through. The opening 4-12A is rectangular, and a long side of the opening 4-12A is parallel with the first direction 4-Di1. Because the frame 4-12 is made of metal, it has better support and can be made thinner.

The fixing plate 4-13 has a hole 4-13A through which the support shaft 4-11C of the base 4-11 passes. The fixing plate 4-13 is disposed above the driving coil 4-32 and the magnetic element 4-31, and prevents the magnetic element 4-31 from being detached from the base 4-11 or hitting other elements when driven.

Refer to FIG. 5. FIG. 5 is a schematic diagram of a partial structure of the optical element driving mechanism 4-1 according to an embodiment of the present invention. The cover 4-14 is disposed above the base 4-11 and the frame 4-12, and has a cover opening 4-14A, a cover hole 4-14B, and three cover hollows 4-14C. The cover opening 4-14A allows the incident light 4-L to pass through. The cover hole 4-14B receives the support shaft 4-11C of the base 4-11. The cover hollows 4-14C receive the main stopper 4-11D and the auxiliary stopper 4-11E, respectively. The cover 4-14 and the base 4-11 can form a housing 4-S (as shown in FIG. 1) of the optical element driving mechanisms 4-1 by engaging the cover opening 4-14B and the cover hollows 4-14C to the support shaft 4-11C of the base 4-11, the main stopper 4-11D, and the auxiliary stopper 4-11E.

Figure 6:
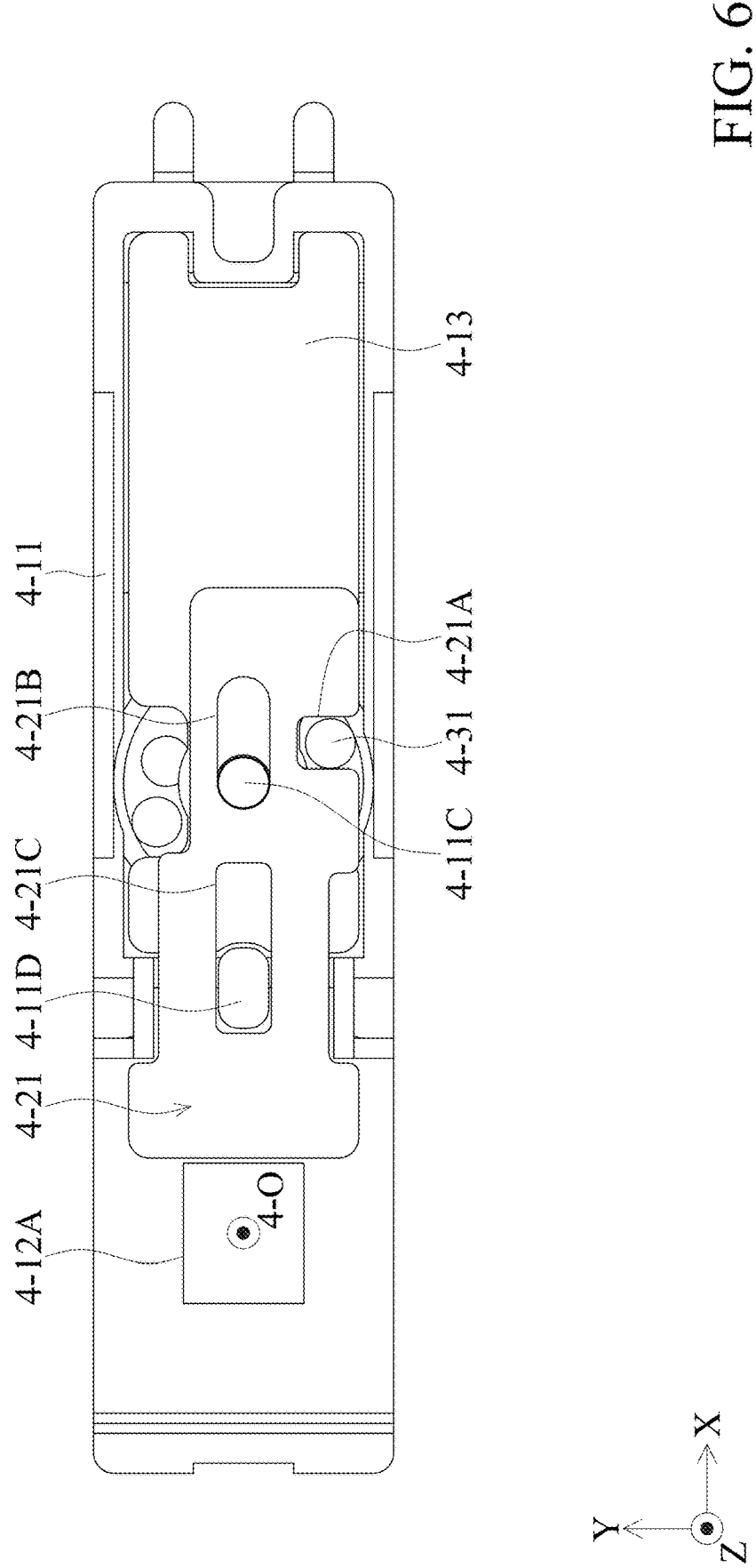
FIG. 6 is a schematic diagram of a partial structure of an optical element driving mechanism according to an embodiment of the present invention.
Figure 7:
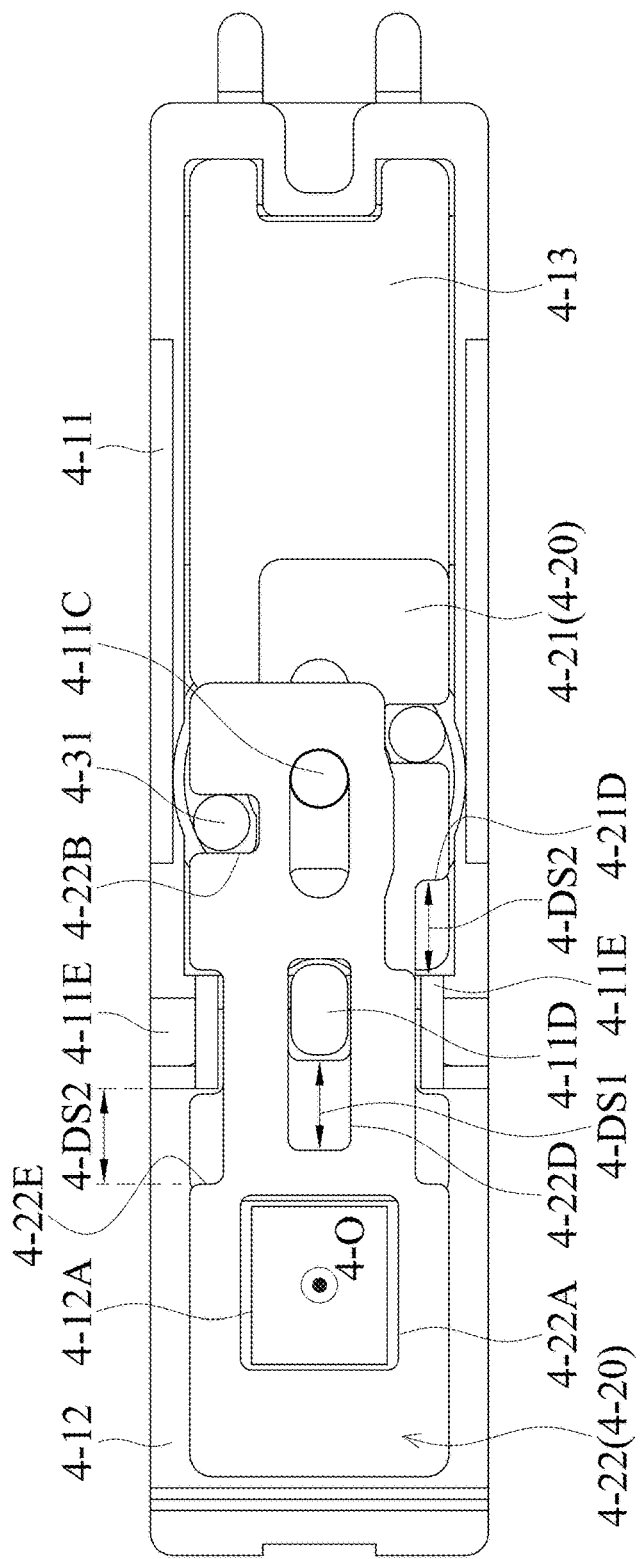
FIG. 7 is a schematic diagram of a partial structure of an optical element driving mechanism according to an embodiment of the present invention.

Refer to FIG. 6 to FIG. 7, which are schematic diagrams of a partial structure of the optical element driving mechanism 4-1 according to an embodiment of the present invention. The first shutter 4-21 has a first recessed portion 4-21A, a first shutter hole 4-21B, and a first shutter hollow 4-21C. The first recessed portion 4-21A is engaged with the magnetic element 4-31, the support shaft 4-11C of the base 4-11 passes through the first shutter hole 4-21B, and the main stopper 4-11D passes through the first shutter hollow 4-21C.

The second shutter 4-22 has a second shutter opening 4-22A, a second recessed portion 4-22B, a second shutter hole 4-22C, and a second shutter hollow 4-22D. The second shutter opening 4-22A allows the incident light 4-L to pass through, the second recessed portion 4-22B engages with the magnetic element 4-31, and the support shaft 4-11C of the base 4-11 passes through the second shutter hole 4-22C, the main stopper 4-11D passes through the second shutter hollow 4-22D.

In this embodiment, the material of the first shutter 4-21 and the second shutter 4-22 is polyethylene terephthalate (PET), and the surface layer is coated with carbon fiber, so that the whole has Non-fragile structure. However, the material is not limited to this, and can be changed to meet requirements. The first shutter 4-21 and the second shutter 4-22 have a roughly rectangular shape, and the length of the short side of the first shutter 4-21 and the second shutter 4-22 are longer than the length of the short side of the opening 4-12A, so as to achieve the shielding effect. A part of the first shutter 4-21 and the second shutter 4-22 are disposed in the slide rail 4-11F of the base 4-11. In this embodiment, the first shutter 4-21 and the second shutter 4-22 are shared the same slide rail 4-11F so as to miniaturize the mechanism. However, it is not limited to this, and can be changed to meet requirements, for example, the first shutter 4-21 and the second shutter 4-22 are disposed on different slide rails 4-11F.

The first shutter 4-21 and the second shutter 4-22 are disposed between the fixing plate 4-13 and the cover 4-14. In this embodiment, as shown in FIG. 7, when viewed in a direction that is parallel with the axis 4-O, the first shutter 4-21 is below the second shutter 4-22, but is not limited this. The order of assembling of the first shutter 4-21 and the second shutter 4-22 may be changed. In other words, the first shutter 4-21 may be above the second shutter 4-22.

Figure 8:
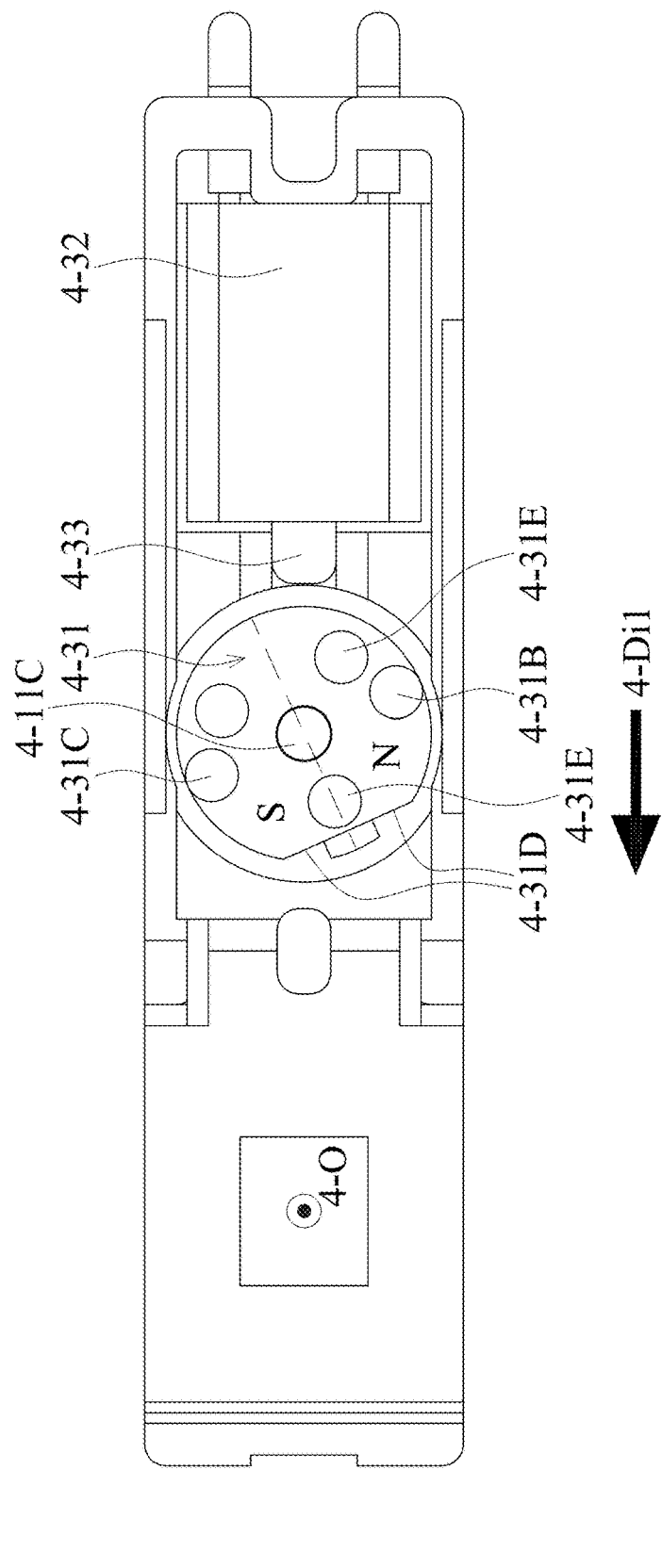
FIG. 8 is a schematic diagram of a partial structure of an optical element driving mechanism according to an embodiment of the present invention.

Refer to FIG. 8. FIG. 8 is a schematic diagram of a partial structure of an optical element driving mechanism 4-1 according to an embodiment of the present invention. The magnetic element 4-31 has a through hole 4-31A in the center, and a first protruding portion 4-31B and a second protruding portion 4-31C on the surface. The magnetic element 4-31 is disposed in the magnetic element receiving portion 4-11A via the shaft 4-11C to pass through the through hole 4-31A. The first protruding portion 4-31B is engaged with the first recessed portion 4-21A of the first shutter 4-21, and the second protruding portion 4-31C is engaged with the second recessed portion 4-22B of the second shutter 4-22 (as shown in FIG. 7).

The magnetic element 4-31 is a plastic magnet made by mixing plastic with iron oxide powder and then injection molding through a mold. The advantage of the plastic magnet is that it is easy to process and can obtain small-sized products, so that the optical element driving mechanism 4-1 may achieve miniaturization. In this embodiment, the magnetic element 4-31 has a cylindrical shape with a plurality of notches 4-31D, the notches 4-31D are located away from the driving coil 4-32 when assembled to the base 4-11, and there are a plurality of voids 4-31E on a surface of the magnetic element 4-31. The magnetic element 4-31 may be further reduced in weight without affecting the required magnetic field by these voids 4-31E and the notches 4-31D.

The magnetically permeable element 4-33 is disposed in the driving coil 4-32, and a direction of a winding axis of the driving coil 4-32 is parallel with the first direction 4-Di1. One end of the magnetically permeable element 4-33 is exposed from the driving coil 4-32, and is close to the magnetic element 4-31. A strong electromagnetic force may be generated when a current is applied to the driving coil 4-32 by covering the magnetically permeable element 4-33 with the driving coil 4-32. Moreover, the magnetically permeable element 4-33 is disposed close to the magnetic element 4-31, when the current is not applied, the attractive force between the magnetically permeable element 4-33 and the magnetic element 4-31 may make the magnetic element 4-31 in a stable state.

Figure 9:
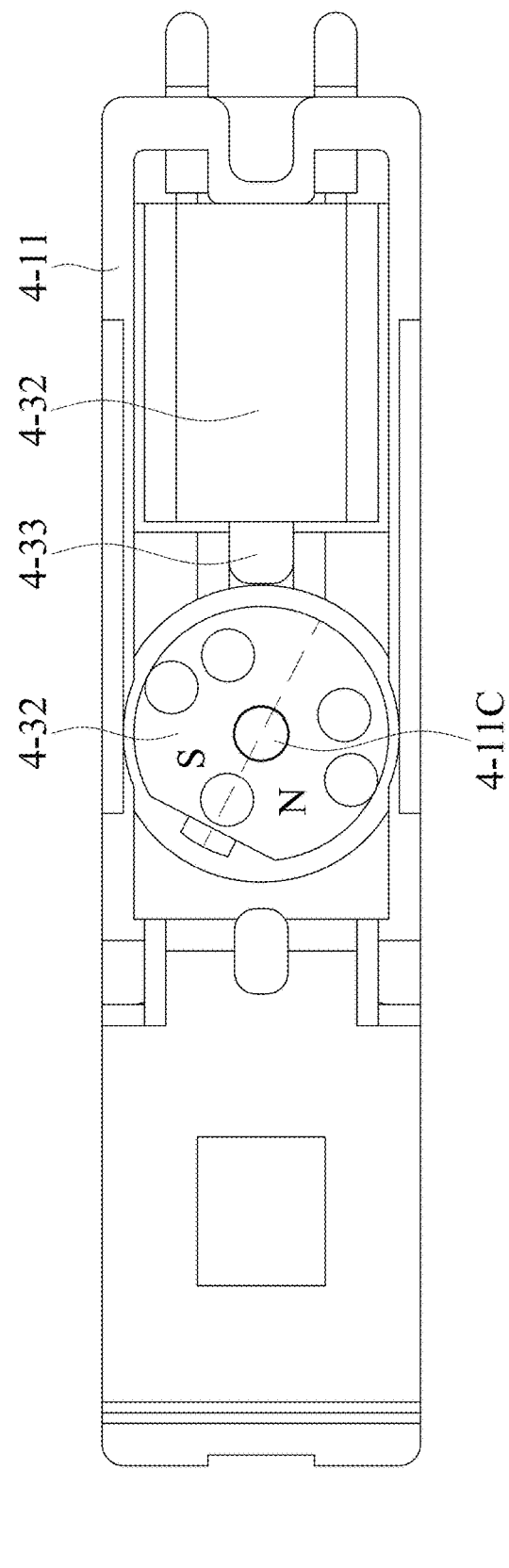
FIG. 9 is a schematic diagram of a partial structure of an optical element driving mechanism according to an embodiment of the present invention.

Refer to FIG. 8 to FIG. 9. FIG. 9 is a schematic diagram of a partial structure of the optical element driving mechanism 4-1 according to an embodiment of the present invention. When a current is applied to the driving coil 4-32, a magnetic field is generated at one end of the magnetically permeable element 4-33. The magnetic field interacts with the magnetic element 4-31, so that the magnetic element 4-31 may rotate around the shaft 4-11C as the center. In this embodiment, when the magnetic element 4-31 is assembled to the base 4-11, it is adjusted to a specific angle. As shown in FIG. 8, when no current is applied, the N-pole of the magnetic element is close to the magnetically permeable element 4-33. When a current is applied to the driving coil 4-32, a magnetic field is generated and a N-pole of the magnetic field is close to the exposed magnetically permeable element 4-33, which is mutually exclusive with the N-pole of the magnetic element and attracts the S-pole of the magnetic element, so the magnetic element 4-31 is driven to rotate at an angle, as shown in FIG. 9, so that the S pole of the magnetic element 4-31 is close to the N pole of the magnetic field. The magnetic element 4-31 may be rotated back to an initial position by applying an opposite current to the driving coil 4-32, so that the magnetic field which is close to the magnetically permeable element 4-33 may change from the N pole to S pole, which is mutually exclusive with the S-pole of the magnetic element 4-31 and attracts the N-pole of the magnetic element 4-31, so the magnetic element 4-31 is driven to rotate back to the initial position.

Figure 12:
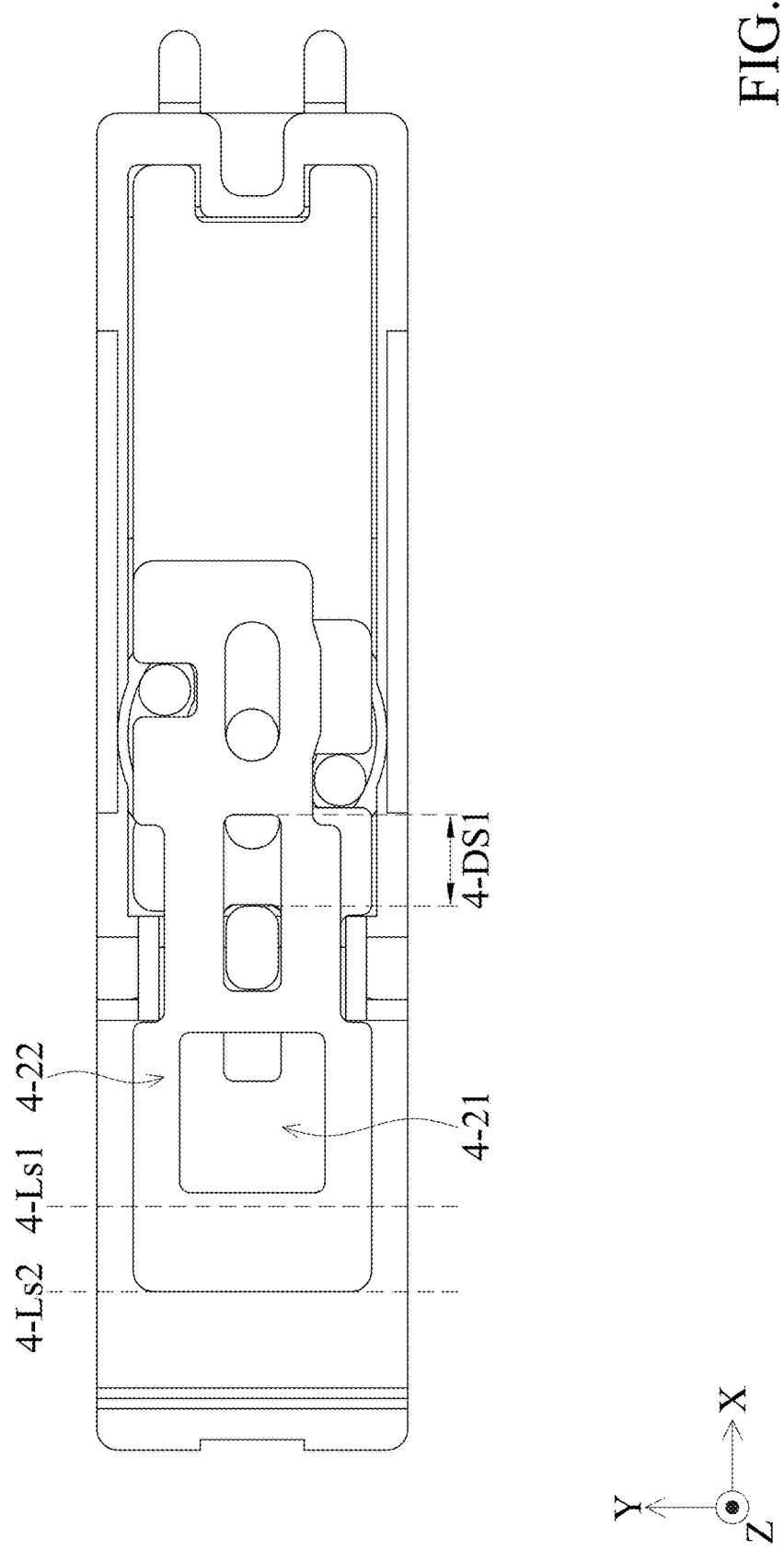
FIG. 12 is a schematic diagram of a partial structure of an optical element driving mechanism according to an embodiment of the present invention.

Refer to FIG. 10A to FIG. 12, which are schematic diagrams of a partial structure of an optical element driving mechanism 4-1 according to an embodiment of the present invention. FIG. 10A shows that the first shutter 4-21 is located at a first shutter initial position 4-Lo1 before the magnetic element 4-31 is rotated. FIG. 10B shows that the first shutter 4-21 is moved to a first shutter shielding position 4-Ls1 after the magnetic element 4-31 is rotated. FIG. 11A shows that the second shutter 4-22 is located at a second initial position 4-Lo2 before the magnetic element 4-31 is rotated. FIG. 11B shows that the second shutter 4-22 is moved to a second shielding position 4-Ls2 after the magnetic element 4-31 is rotated. FIG. 12 shows that the first shutter 4-21 and the second shutter 4-22 shied the opening 4-12A after the magnetic element 4-31 is rotated. As described above, the magnetic element 4-31 may be driven to rotate at an angle by the driving assembly 4-30, so that other elements connected to the magnetic element 4-31 may also be moved in a certain range. More specifically, as shown in FIG. 10A and FIG. 10B, the first shutter 4-21 is engaged with the first protruding portion 4-31B of the magnetic element 4-31 through the first recessed portion 4-21A. When the magnetic element 4-31 rotates an angle, the first shutter 4-21 moves from a first shutter initial position 4-Lo1 to the first shutter shielding position 4-Ls1 by a first distance 4-D1. In addition, as shown in FIG. 11A and FIG. 11B, the second shutter 4-22 is engaged with the second protruding portion 4-31C of the magnetic element 4-31 through the second recessed portion 4-22B. When the magnetic element 4-31 rotates an angle, the second shutter 4-22 moves from the second shutter initial position 4-Lo2 to the second shutter shielding position 4-Ls2 by a second distance 4-D2, and the first distance 4-D1 and the second distance 4-D2 are equal. In this embodiment, the first shutter 4-21 moves in the first direction 4-Di1, and the second shutter 4-22 moves in a second direction 4-Di2, and the second direction 4-Di2 is the opposite of the first direction 4-Di1. That is, the moving direction of the first shutter 4-21 is the opposite of the moving direction of the second shutter 4-22.

As shown in FIG. 12, when the first shutter 4-21 is located at the first shutter shielding position 4-Ls1, and the second shutter 4-22 is located at the second shutter shielding position 4-Ls2, the first shutter 4-21 and the second shutter 4-22 completely shield the opening 4-12A. More specifically, the first shutter 4-21 shields at least half of the area of the opening 4-12A (as shown in FIG. 10B), and the second shutter 4-22 also shields at least half the area of the opening 4-12A (as shown in FIG. 11B). When viewed in a direction parallel with the optical axis 4-0 at the position of the opening 4-12A, the first shutter 4-21 and the second shutter 4-22 may partially overlap to shield the opening 4-12A completely.

There are two ways to stop the optical element driving mechanism 4-1. The first way is to control the rotation angle of the magnetic element 4-31 by the current input to the driving coil 4-32, and the optical element driving mechanism 4-1 may stop when the magnetic element 4-31 is driven to rotate to a certain angle. The second way is to dispose a stop portion, and the optical element driving mechanism 4-1 may stop when an element strikes the stop portion. This embodiment combines the two ways described above to control the magnetic element 4-31 to rotate in the certain angle, so that the movable portion 4-20 moves within the first distance 4-D1. Moreover, the movable portion 4-20 is restricted to moving within a first stopping distance 4-DS1 by the main stopper 4-11D being disposed in the first shutter hollow 4-21C and the second shutter hollow 4-22D. More specifically, refer to FIG. 7, and FIG. 10A to FIG. 12. When the movable portion 4-20 is in the initial position, a side wall of the main stopper 4-11D is in contact with a surface of the first shutter hollow 4-21C or a surface of the second shutter hollow 4-22D, and the distance between another side wall opposite the side wall and another surface opposite the surface is the first stopping distance 4-DS1. The first stopping distance 4-DS1 is slightly longer than half the length of the long side of the opening 4-12A, and is slightly longer than or equal to the first distance 4-D1. The movable section 4-20 may stop when the surface of the first shutter hollow 4-21C or the surface of the second shutter recess 4-22D touches the main stopper 4-11D. Therefore, with this structural design, the movable portion 4-20 may still be controlled so that it remains within the first stopping distance 4-DS1, even if the first shutter 4-21 or the second shutter 4-22 moves beyond the first distance 4-D1 because of the current control error.

In addition, in this embodiment, there are two auxiliary stopping portions 4-11E to further restrict the range of motion of the movable portion 4-20. The two auxiliary stoppers 4-11E protrude inward from the two side walls of the base 4-11. The distance between a stop surface 4-21D of the first shutter 4-21 and the auxiliary stopper 4-11E is the second stopping distance 4-DS2, and the distance between a stop surface 4-22E of the second shutter 4-22 and the auxiliary stop 4-11E is the second stopping distance 4-DS2. The movable portion 4-20 stops when the stop surface 4-21D of the first shutter 4-21 or the stop surface 4-22E of the second shutter 4-22 touches the auxiliary stopper 4-11E, so that the movable portion 4-20 is restricted to moving within the second stopping distance 4-DS2. In this embodiment, the first stopping distance 4-DS1 is shorter than the second stopping distance 4-DS2, but it is not limited to this, and can be changed to meet requirements.

Moreover, the movable portion 4-20 is restricted to moving only within a certain range by the main stopper 4-11D and the auxiliary stopper 4-11E as described above. Therefore, it may not happen that the movable portion 4-20 exceeds the movement range, and the magnetic element 4-31 is rotated by more than the certain angle, so that the magnetic element 4-31 may not be driven back to the initial position by the driving coil 4-32.

When the opposite current is input, the operation of each element is described below in detail. When the opposite current is applied to the driving coil 4-32, the driving coil 4-32 drives the magnetic element 4-31 to rotate back to the initial direction, and the first shutter 4-21 moves from the first shutter shielding position 4-Ls1 back to the first shutter initial position 4-Lo1 by the first distance 4-D1, and the second shutter 4-22 moves from the second shutter shielding position 4-Ls2 back to the second shutter initial position 4-Lo2 by the second distance 4-D2. Therefore, the opening 4-12A returns from the state of being shielded to the state of not being shielded.

Figure 13:
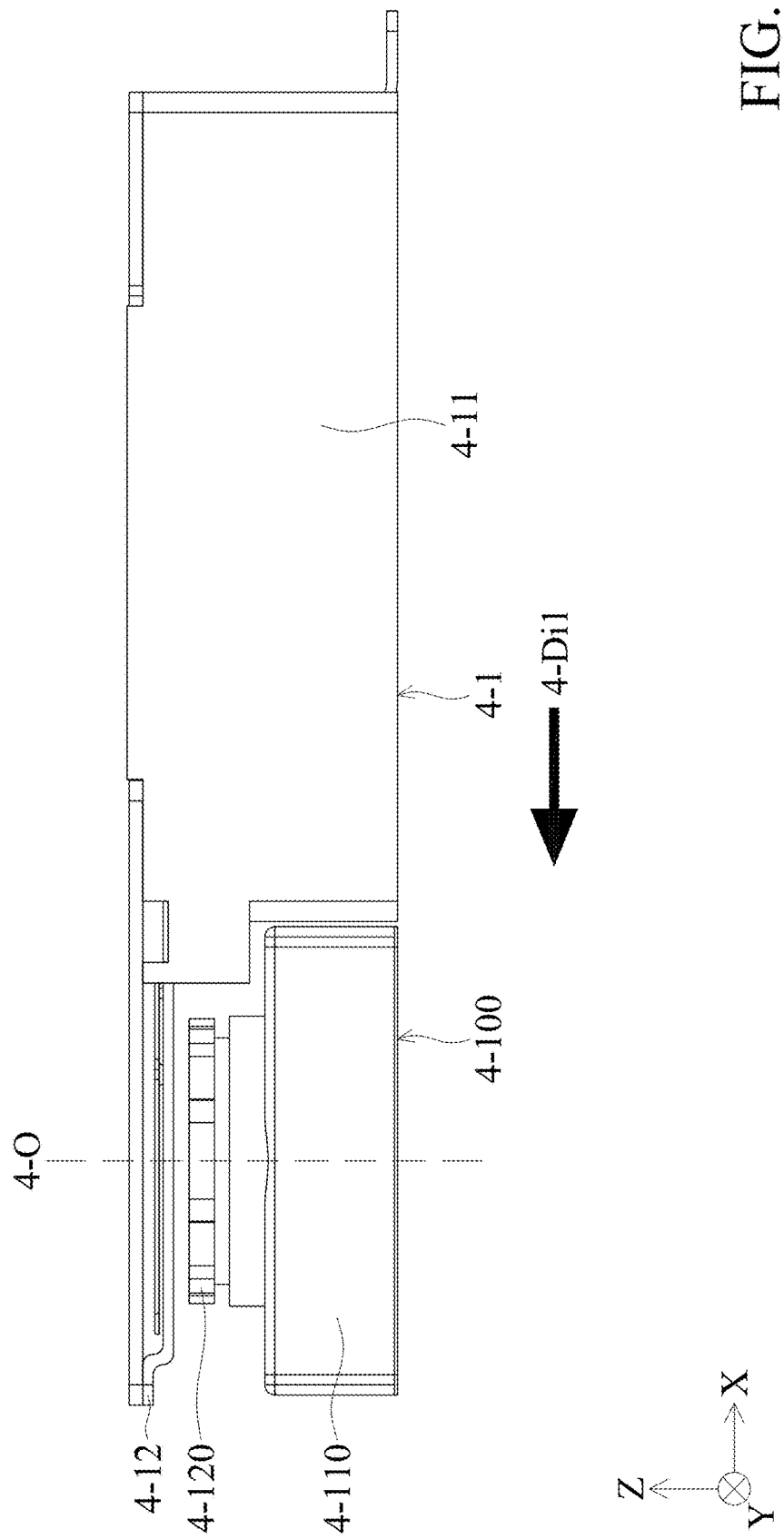
FIG. 13 is a side view of an optical element driving mechanism according to another embodiment of the present invention.
Figure 14:
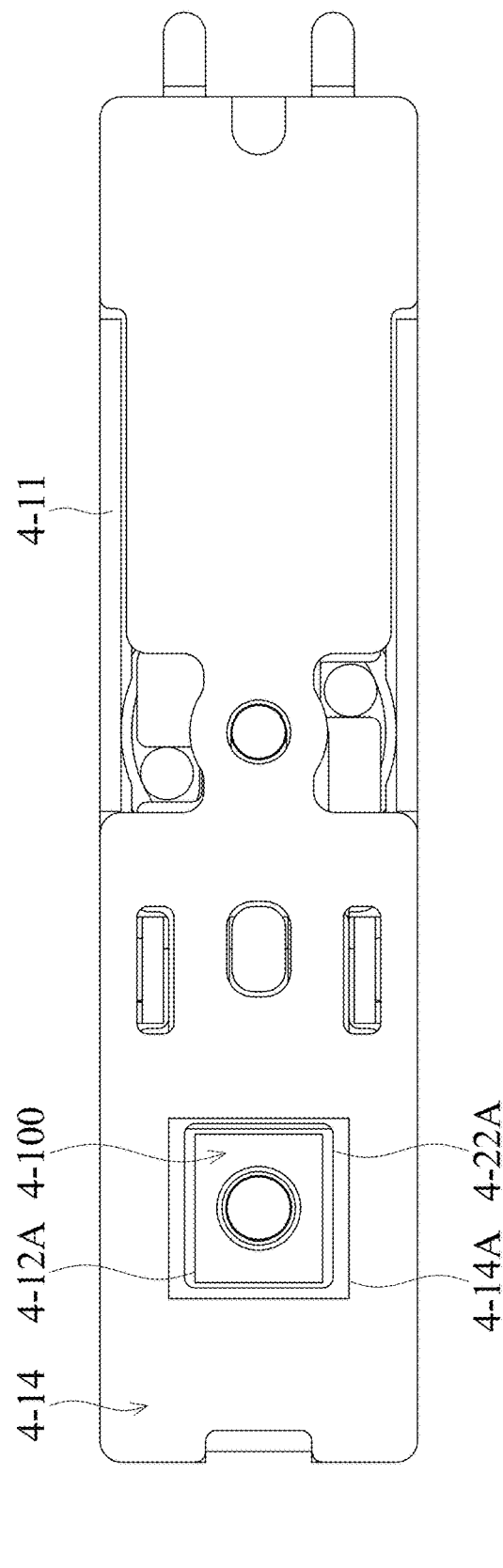
FIG. 14 is a top view of an optical element driving mechanism according to another embodiment of the present invention.

Refer to FIG. 13 to FIG. 14. FIG. 13 is a side view of an optical element driving mechanism 4-1 according to another embodiment of the present invention, and FIG. 14 is a top view of an optical element driving mechanism 4-1 according to another embodiment of the present invention. With the operation as described above, the movable portion 4-20 may be applied as optical elements such as shutter blades, filters, deflectors, polarizers, etc., and the optical element driving mechanism 4-1 may be used to control the amount of light. As shown in FIG. 13, the optical element driving mechanism 4-1 further includes an optical module 4-100. The optical module 4-100 has a rectangular structure and includes a casing 4-110, a lens 4-120, and an image sensor (not shown). The optical module 4-100 is disposed below the frame 4-12. The optical axis 4-0 passes through the center of the optical module 4-100. When viewed in a direction parallel with the first direction 4-Di1, the optical module 4-100 overlaps the base 4-11, the magnetic element 4-31, and the driving coil 4-32.

The incident light 4-L enters the optical module 4-100 through the cover opening 4-14A, the second shutter opening 4-22A, and the opening 4-12A in order. In order to avoid interference of reflected light and stray light, a light absorbing material is coated on a side of the frame 4-12 near the optical module 4-100. In addition, a simulation of light cone is used to determine the size of the different openings. The closer the opening is to the lens 4-120 of the optical module 4-100, the smaller the opening is. That is, the size of the outer cover opening 4-14A is larger than the second shutter opening 4-22A, the second shutter opening 4-22A is larger than the opening 4-12A, and the opening 4-12A is larger than the lens 4-120.

The arrangement of the optical module 4-100 is not limited to the above structure. For example, the frame 4-12 can be disposed to the inside of the optical module 4-100 so that the incident light 4-L may pass through the lens 4-120 and then through the movable portion, such the structural design may be applied to, for example, a single lens reflex camera.

In summary, the present embodiment provides an optical element driving mechanism including a fixed portion, a movable portion, and a driving assembly. The movable portion is movably disposed on the fixed portion. The driving assembly is disposed on the fixed portion and drives the movable portion to move relative to the fixed portion. Thereby, it is possible to provide an optical mechanism that is more compact and can be applied to various kind of light quantity control.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, having an optical axis, comprising:
   a fixed portion, comprising a base and a frame, wherein the frame has an opening, extending from the base toward a first direction, wherein the first direction is perpendicular to the optical axis;
   a movable portion, movably disposed on the fixed portion, comprising a first shutter and a second shutter, the first shutter is engaged with a first protrusion, and the second shutter is engaged with a second protrusion;
   a driving assembly, disposed on the fixed portion, driving the movable portion to move relative to the fixed portion, comprising a magnetic element and a driving coil, and the magnetic element has a first protruding portion and a second protruding portion;
   wherein the base comprises:
   a magnetic element receiving portion, receiving the magnetic element;
   a driving coil receiving portion, receiving the driving coil, disposed close to the magnetic element receiving portion, wherein when viewed in a direction that is perpendicular to the optical axis, the magnetic element receiving portion overlaps the driving coil receiving portion; and
   a main stopper, restricting the first shutter and the second shutter to move within a first stopping distance,
   wherein the first shutter has a first shutter recess hole and the second shutter has a second shutter recess hole, the main stopper pass through the first shutter recess hole and the second shutter recess hole.

2. The optical element driving mechanism as claimed in claim 1, wherein a material of the frame is metal, and the frame is fixed to the base by insert molding.

3. The optical element driving mechanism as claimed in claim 1, wherein a winding axis of the driving coil is parallel with the first direction.

4. The optical element driving mechanism as claimed in claim 1, wherein the driving assembly further comprises a magnetically permeable element disposed in the driving coil, and one end of the magnetically permeable element is exposed from the driving coil.

5. The optical element driving mechanism as claimed in claim 1, wherein the driving coil drives the magnetic element to rotate at an angle to drive the first shutter to move a first distance in the first direction from a first shutter initial position to a first shutter shielding position, and to drive the second shutter to move a second distance in a second direction from a second shutter initial position to a second shutter shielding position.

6. The optical element driving mechanism as claimed in claim 5, wherein the first direction and the second direction are opposite directions.

7. The optical element driving mechanism as claimed in claim 5, wherein the first distance is equal to the second distance.

8. The optical element driving mechanism as claimed in claim 5, wherein the first shutter moves the first distance to shield at least half of the area of the opening, and the second shutter moves the second distance to shield at least half of the area of the opening.

9. The optical element driving mechanism as claimed in claim 5, wherein the first shutter is located at the first shutter shielding position and the second shutter is located at the second shutter shielding position, and when viewed in a direction that is parallel with the optical axis, the first shutter partially overlaps the second shutter.

10. The optical element driving mechanism as claimed in claim 5, wherein the first distance is shorter than or equal to the first stopping distance.

11. The optical element driving mechanism as claimed in claim 1, wherein the base further comprises an auxiliary stopper to restrict the first shutter and the second shutter to move within a second stopping distance.

12. The optical element driving mechanism as claimed in claim 1, further comprising an optical module, wherein the optical axis passes through a center of the optical module.

13. The optical element driving mechanism as claimed in claim 12, wherein the optical module has a rectangular structure.

14. An optical element driving mechanism, having an optical axis, comprising:
   a fixed portion, comprising a base and a frame, wherein the frame has an opening, extending from the base toward a first direction, wherein the first direction is perpendicular to the optical axis;
   a movable portion, movably disposed on the fixed portion, comprising a first shutter and a second shutter, the first shutter is engaged with the first protrusion, and the second shutter is engaged with the second protrusion;
   a driving assembly, disposed on the fixed portion, driving the movable portion to move relative to the fixed portion, comprising a magnetic element and a driving coil, and the magnetic element has a first protruding portion and a second protruding portion;

wherein the base, comprising:

a magnetic element receiving portion, receiving the magnetic element;

a driving coil receiving portion, receiving the driving coil, disposed close to the magnetic element receiving portion, wherein when viewed in a direction that is perpendicular to the optical axis, the magnetic element receiving portion overlaps the driving coil receiving portion; and a main stopper, restricting the first shutter and the second shutter to move within a first stopping distance, wherein the opening of the frame is rectangular, and a long side of the opening is parallel with the first direction.

15. The optical element driving mechanism as claimed in claim 14, wherein the first stopping distance is greater than half the length of the long side of the opening.

16. An optical element driving mechanism, having an optical axis, comprising:

a fixed portion, comprising a base and a frame, wherein the frame has an opening, extending from the base toward a first direction, wherein the first direction is perpendicular to the optical axis;

a movable portion, movably disposed on the fixed portion, comprising a first shutter and a second shutter, the first shutter is engaged with the first protrusion, and the second shutter is engaged with the second protrusion;

a driving assembly, disposed on the fixed portion, driving the movable portion to move relative to the fixed portion, comprising a magnetic element and a driving coil, and the magnetic element has a first protruding portion and a second protruding portion;

wherein the base, comprising:

a magnetic element receiving portion, receiving the magnetic element;

a driving coil receiving portion, receiving the driving coil, disposed close to the magnetic element receiving portion, wherein when viewed in a direction that is perpendicular to the optical axis, the magnetic element receiving portion overlaps the driving coil receiving portion; and a main stopper, restricting the first shutter and the second shutter to move within a first stopping distance, an auxiliary stopper, restricting the first shutter and the second shutter to move within a second stopping distance;

wherein the first stopping distance is shorter than the second stopping distance.

* * * * *